Dec. 10, 1968    N. O. OLSSON    3,415,401
IMPLEMENT TRANSPORT ATTACHMENT
Filed March 22, 1967    3 Sheets-Sheet 2

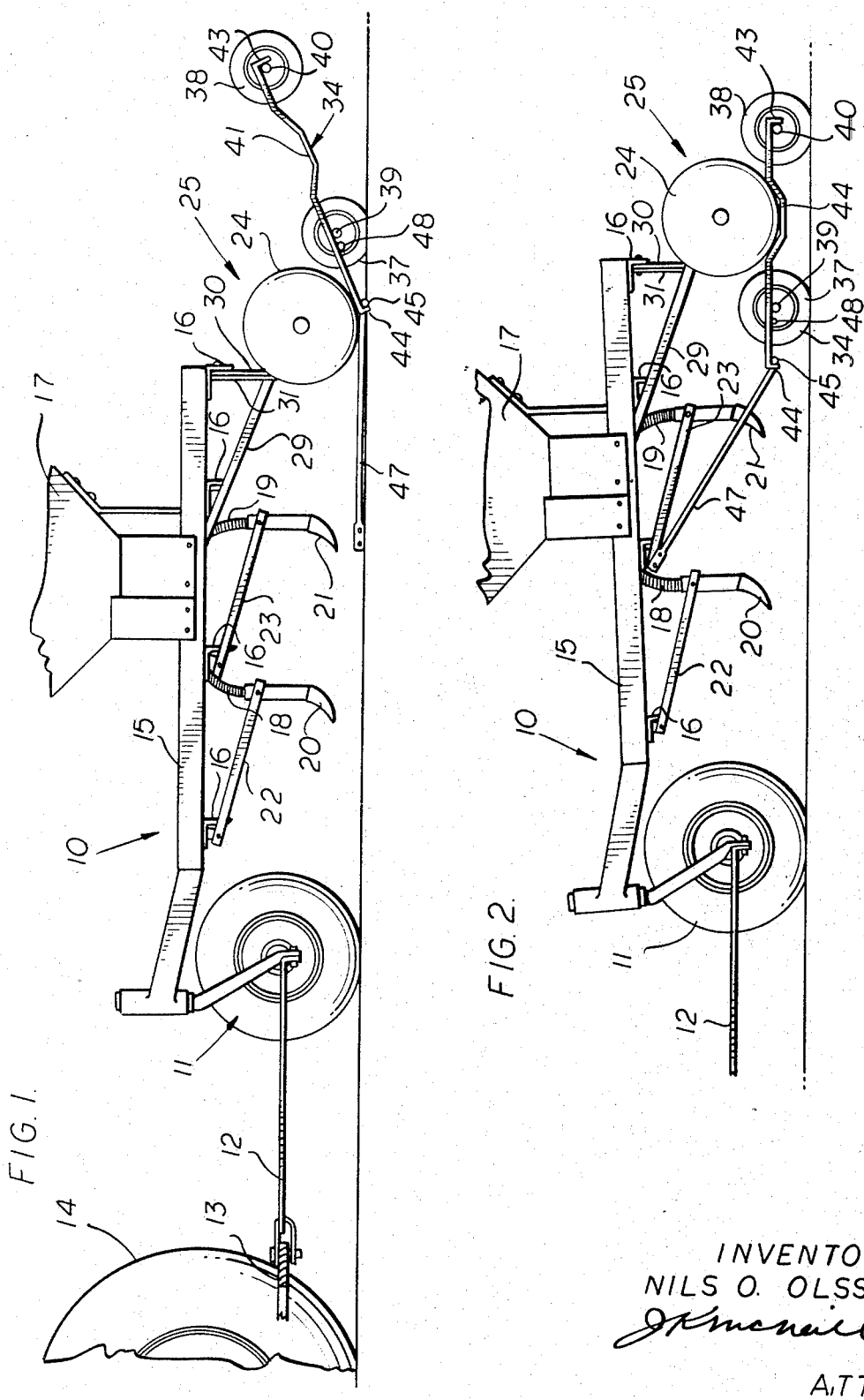

INVENTOR
NILS O. OLSSON

JK McNuies

ATTY

Dec. 10, 1968     N. O. OLSSON     3,415,401
IMPLEMENT TRANSPORT ATTACHMENT

Filed March 22, 1967                    3 Sheets-Sheet 3

INVENTOR
NILS O. OLSSON

ATTY

United States Patent Office 3,415,401
Patented Dec. 10, 1968

3,415,401
IMPLEMENT TRANSPORT ATTACHMENT
Nils O. Olsson, Ancaster, Ontario, Canada, assignor to International Harvester Company, Chicago, Ill., a corporation of Delaware
Filed Mar. 22, 1967, Ser. No. 625,204
4 Claims. (Cl. 214—506)

ABSTRACT OF THE DISCLOSURE

A transport attachment for an implement such as a grain drill having press wheels upon which the implement customarily rolls when being transported. The transport attachment comprises a low platform mounted on longitudinally spaced wheels and having a central well section to receive certain of the press wheels of the implement, the wheels of the transport attachment being prevented from rolling while the implement is being loaded upon it by a locking pin insertable in one of the transport wheels and engageable with the platform, the pin being removable when the implement is ready to be transported.

---

This invention relates to agricultural implements and particularly to grain drills and the like. More specifically, the invention concerns a novel transport attachment for a press drill.

In an implement such as a press drill, seed and the like is deposited in furrows formed by earth penetrating tools followed by press wheels which firm soil over the seed and are usually provided with steel or zero pressure pneumatic tires. The rear end of the implement is customarily supported on these press wheels, and since the implement is often transported at high speeds over hard and rough surfaces, vibrations are set up in the implement and the tires are damaged. Therefore, an object of this invention is the provision of a simple and economical transport attachment for an implement such as a press drill whereby the above mentioned disadvantages are avoided.

Another object of the invention is the provision of a novel transport attachment for an implement such as a drill having press wheels on which the implement is customarily transported, wherein a wheeled platform is provided upon which the press wheels can be easily driven and wherein means are provided for immobilizing the wheels of the transport attachment to facilitate driving the implement thereon.

Other objects and advantages of the invention will become clear from the following detailed description when read in conjunction with the accompanying drawings wherein:

FIGURE 1 is a diagrammatic view in side elevation showing the rear end of a tractor to which is connected an implement of the press drill type and illustrating one step in the process of loading the rear end of the implement upon the transport attachment incorporating the features of this invention;

FIGURE 2 is a diagrammatic side elevation similar to FIGURE 1 showing the transport attachment in its operating position;

Figure 3:
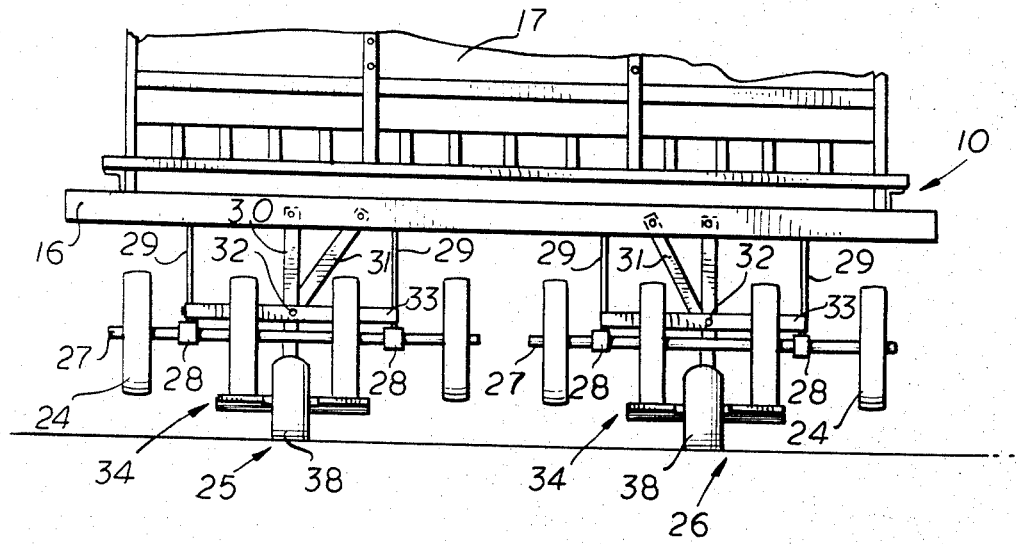
FIGURE 3 is a rear elevation of the structure shown in FIGURE 2.
Figure 4:
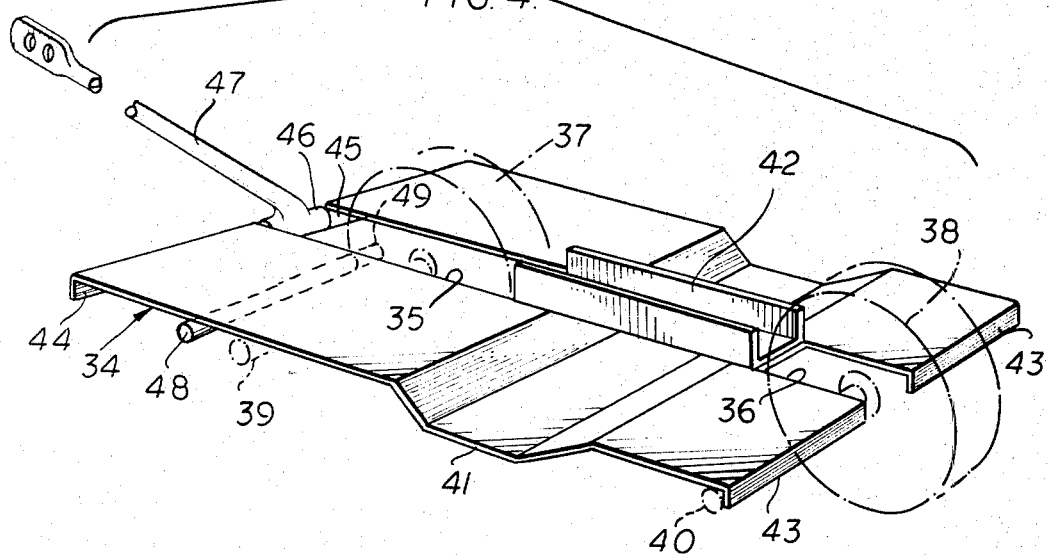
FIGURE 4 is a perspective view of the transport attachment of this invention.

In FIGURE 1 is shown diagrammatically the supporting frame 10 of a press drill having one or more castering wheels 11 at its front end and connected by a hitch structure 12 to the drawbar 13 of a tractor 14. The frame 10 is generally rectangular and includes longitudinally extending side bars 15 and two or more transverse frame bars 16, the frame supporting a hopper 17 from which material is dispensed through flexible tubes 18 and 19 to earth penetrating tools 20 and 21, tools 20 and 21 being connected by links 22 and 23, respectively, to the implement frame.

Press wheels 24 are shown diagrammatically in the drawings as being mounted in left- and right-hand gangs 25 and 26, each gang consisting of four press wheels mounted on a transverse shaft 27 on which is also mounted bearings 28 connected by links 29 to the frame.

The gangs 25 and 26 are further supported by straps 30 and 31 the lower ends of which are connected by a pivot pin 32 to an equalizer bar 33, the ends of which are pivotally connected to links 29 accommodating tilting of the gangs about pivots 32 during operation in accordance with variations in ground contour.

In order to elevate the press wheels 24 above the ground for transport, a supporting unit is provided comprising a platform 34 having front and rear cutouts 35 and 36 in which are mounted wheels 37 and 38 rotatably carried by axles 39 and 40, respectively. Between wheels 37 and 38 platform 34 is provided with a depressed section 41 centrally bridged by a channel-shaped brace member 42.

The rear end of the platform 34 is bend downwardly to form flanges 43 forming an angle with the horizontal portion of the platform to receive rear wheel shaft 40.

The forward end of the platform is bent downwardly to form flanges 44 forming an angle to receive a bar 45, upon which. in the cutout section 35, is mounted a bearing 46 to which is secured a stabilizer in the form of a drag link 47.

Figure 5:
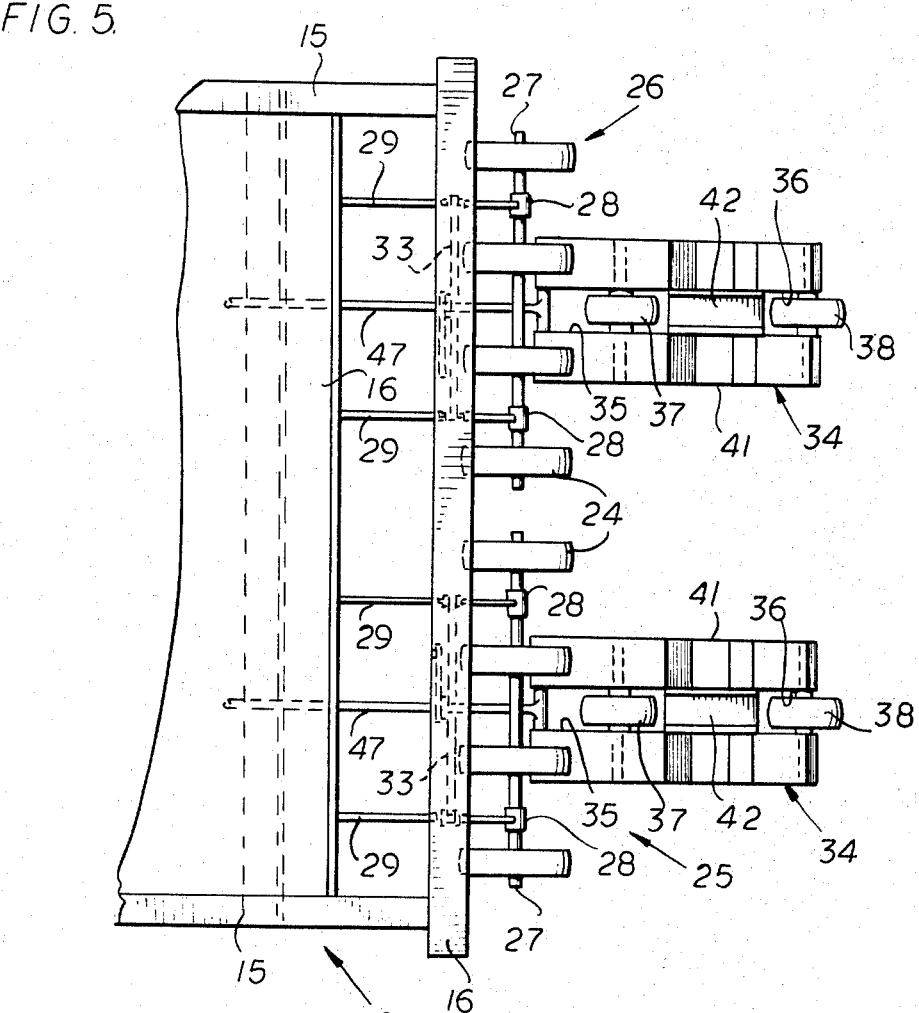
FIGURE 5 is a plan view of a portion of the structure shown in FIGURE 1 preparatory to loading the implement on the transport attachment.
Figure 6:
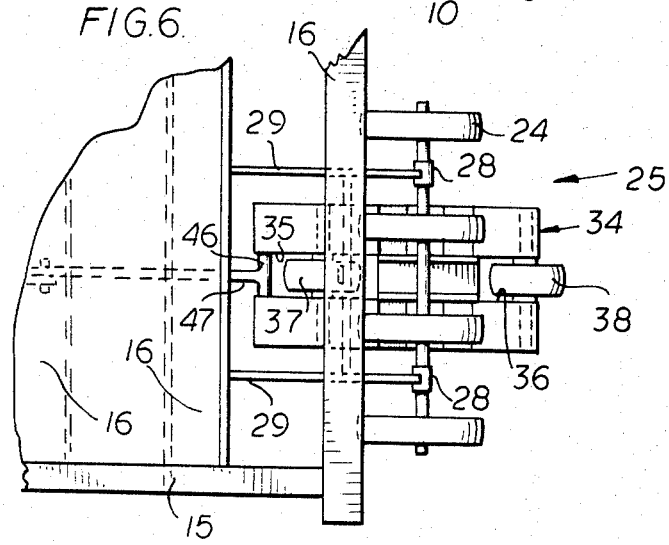
FIGURE 6 shows a portion of the structure of FIGURE 5 with the transport attachment in operating or transport position.

FIGURES 1 and 5 show the transport attachment of this invention preparatory to loading the rear portion of the implement upon it. The implement is backed up until the central press wheels 24 of each of the gangs 25 and 26 engages the forward end of platform 34 at opposite sides of wheel 37, tilting the rear end of the platform upwardly as shown in FIGURE 1. The platform is prevented from slipping rearwardly by locking wheel 37 against rotation, and this is accomplished by the provision of a removable rod 48, one end of which is receivable in an opening 49 provided in wheel 37, the outwardly projecting portion of the rod abutting the undersurface of the platform.

The implement is backed further until press wheels 24 are received in the well section 41 of the platform. Drag link 47 is then connected to the implement frame as shown in FIGURE 2, rod 48 is removed, and the implement is ready to be transported.

To unload the implement from the transport attachment prior to operating the implement, the drag links are simply disconnected from the implement frame and stop rods 48 again inserted in the openings 39 in wheels 37. The tractor is driven forwardly to reverse the procedure described.

It is believed that the construction and operation of the novel transport attachment of this invention will be clearly understood from the foregoing description. It should likewise be understood that the invention has been described in a preferred embodiment only and that modifications may be made therein without departing from the spirit of the invention or the scope of the appended claims.

What is claimed is:

1. For use with an implement having a frame supported at its forward end for operation and transport and ground engaging members on its rear end, a transport attachment for supporting said ground engaging members above the ground comprising, longitudinally spaced wheels, a longitudinally extending platform extending horizontally between and carried by said wheels and having formed integrally therewith a forwardly projecting portion adapted to engage the ground and form with said platform a ramp when said platform is tilted from its horizontal position with its rear end raised to accommodate backing the implement until said ground engaging members are disposed between said wheels, whereby the platform is returned to its horizontal position, and stabilizer means pivotally connected at one end to said forwardly projecting portion of the platform and having means for connecting its other end to said frame.

2. The invention set forth in claim 1, wherein said platform is provided with a depressed portion centrally thereof to receive said ground engaging members.

3. The invention sets forth in claim 2, wherein a locking pin is removably attachable to one of said wheels at a location radially removed from the axis thereof and is engageable with said platform to immobilize said wheels until said ground engaging members have been driven onto said platform and are disposed between said wheels.

4. The invention set forth in claim 3, wherein said ground engaging members are laterally spaced gangs of press wheels for a grain drill and one of said transport attachments is provided for each of said gangs.

References Cited

UNITED STATES PATENTS

| 2,391,503 | 12/1945 | Page | 214—506 |
|-----------|---------|------|---------|
| 2,541,582 | 2/1951 | Hawkins | 214—334 X |
| 2,776,063 | 1/1957 | Larson | 214—334 |
| 3,361,277 | 1/1968 | Johnson et al. | 214—334 |

HUGO O. SCHULZ, *Primary Examiner.*

U.S. Cl. X.R.

214—334